United States Patent [19]
Berliner

[11] Patent Number: 5,765,192
[45] Date of Patent: Jun. 9, 1998

US005765192A

[54] METHOD AND COMPUTER PROGRAM PRODUCT TO REUSE DIRECTORY SEARCH HANDLES

[75] Inventor: Brian Berliner, Colorado Springs, Colo.

[73] Assignee: Sun Microsystems, Inc., Mountain View, Calif.

[21] Appl. No.: 639,531

[22] Filed: May 1, 1996

[51] Int. Cl.$^6$ .............................. G06F 17/30; G06F 12/00
[52] U.S. Cl. ..................... 711/136; 711/113; 711/205; 711/207; 707/3; 707/205; 707/206
[58] Field of Search ..................... 395/622, 621, 395/463, 471, 487, 497.04, 415; 707/205, 206, 3; 711/113, 136, 205, 207

[56] References Cited

U.S. PATENT DOCUMENTS

| | | | |
|---|---|---|---|
| 4,322,795 | 3/1982 | Lange et al. | 364/200 |
| 4,835,686 | 5/1989 | Furuya et al. | 364/200 |
| 4,920,478 | 4/1990 | Furuya et al. | 364/200 |
| 5,008,820 | 4/1991 | Christopher, Jr. et al. | 364/200 |
| 5,125,085 | 6/1992 | Phillips | 395/400 |
| 5,325,504 | 6/1994 | Tipley et al. | 395/425 |
| 5,367,659 | 11/1994 | Iyengar et al. | 395/425 |
| 5,457,793 | 10/1995 | Elko et al. | 395/600 |
| 5,530,833 | 6/1996 | Iyengar et al. | 395/455 |
| 5,636,359 | 6/1997 | Beardsley et al. | 395/449 |

OTHER PUBLICATIONS

IBM Technical Disclosure Bulletin, vol. 35, No. 6, 1 Nov. 1992, p. 6, "APPC Memory and Segment Selector Reuse Buffer Pool".

IBM Technical Disclosure Bulletin, vol. 34, No. 6, 1 Nov. 1991, pp. 8–10, "Shared Folders Efficient Caching Algorithm".

IBM Technical Disclosure Bulletin, vol. 32, No. 9A, 1 Feb. 1990, pp. 144–151, "Fast Seek Technique".

*Primary Examiner*—Thomas G. Black
*Assistant Examiner*—Jean R. Homere
*Attorney, Agent, or Firm*—William J. Kubida; James A. Pinto; Holland & Hart LLP

[57] ABSTRACT

A method is disclosed for reusing directory search handles in a manner that minimizes the possibility that a handle allocated for a directory search request that is not yet complete will be reused. This method is implemented by assigning a block of system memory at the time of system initialization for the creation of a set of directory search and information retrieval handle structures. Handle structures within the set are allocated as they are needed. When all have been allocated, they are reused, one at a time in a least-recently-used fashion which gives preference to handle structures which have the lowest probability of being associated with an incomplete search request.

12 Claims, 2 Drawing Sheets

METHOD AND COMPUTER PROGRAM PRODUCT TO REUSE DIRECTORY SEARCH HANDLES

This application is related to U.S. application Ser. No. 08/640,670 entitled "Method For Creating a Single Binary Virtual Device Driver for a Windowing Operating System" filed on May 1, 1996; to U.S. application Ser. No. 08/641,654 entitled "Method For Implementing a Non-Volitile Caching Product for Networks and CD-ROMS" filed on May 1, 1996; to U.S. application Ser. No. 08/641,653 entitled "Multi-Tier Cache System and Method for Implementing Such a System" filed on May 1, 1996; to U.S. application Ser. No. 08/640,527 entitles "Method For Caching Network and CD-ROM File Accesses Using a Local Hard Disk" filed on May 1, 1996; and to U.S. application Ser. No. 08/641,523 entitled "Method For Purging Unused Data from a Cache Memory" filed on May 1, 1996, all assigned to Sun Microsystems, Inc., assignee of the present invention, the disclosures of which are herein incorporated by this reference.

BACKGROUND OF THE INVENTION

1. Field of the Invention

This invention relates to file system housekeeping and management methods used in conjunction with caching schemes for data processing systems and, more particularly, to directory information retrieval methods which employ tags known as "handles" for directory search and retrieval operations.

2. Description of Related Art

Caching has long been employed to increase performance of a relatively slow computer memory resource when a faster memory resource, which typically has a higher cost per stored bit, is available. Typically, a temporary memory block within the faster memory resource (i.e., a cache) is established for storing only a portion of the information stored within the slower memory resource. Rather than store within the faster memory resource an entire application program or an entire data file that may be resident on the slower memory resource, certain algorithms are employed to determine which portions of the program or data file are most likely to be accessed. When the system's central processing unit (CPU) calls a memory location that is not stored in the cache, the cache (if completely filled) must be at least partially overwritten with the required data from the slower memory resource. Likewise, when permanent changes are made to data, data in both the cache and the slower memory resource must be updated to reflect that change.

Distributed data processing networks and the LANs within those distributed networks can often benefit from caching for at least two main reasons. Firstly, though a distant memory resource (e.g. a disk drive on a distant server system) may be as fast or even faster than local memory resources, long distance interconnections over a data link can dramatically slow access time to that distant resource. Secondly, all data links (whether between the LANs of a distributed processing network, or between the individual systems, or nodes, of a LAN) have a finite bandwidth. Thus, only a finite amount of data may be simultaneously transferred over the link. Once the bandwidth is exceeded, as for example when more than a certain number of users are attempting to communicate over the same link, response time over that link will degrade as each user's request is delayed in order to somewhat evenly accomodate all competing requests. Consequently, caching of data read over a network can generally increase system performance both by reducing data link loading and by providing the end user with a cache of rapidly accessible data.

Within the last several years, compact disc read-only-memory devices (CD-ROMs) have become extremely popular due to the availability of low-cost, high-capacity compact disk storage media and relatively low cost CD-ROM readers (drives). In fact, nearly all new personal computers being sold in the U.S. include an installed CD-ROM drive. Although current CD-ROM media are capable of storing approximately 450–500 megabytes of data, access to that data is considerably slower than data stored on a modern hard disk drive. For example, the current standard for a high-performance CD-ROM drive, known as a "16X" drive is capable of reading, at most, about 600 kilobytes of data per second. A modern high-speed IDE hard disk drive, on the other hand, is capable of reading about six megabytes per second—roughly ten times the speed of a 6X CD-ROM drive. Thus, CD-ROM drive performance may also be greatly enhanced through caching.

Many graphical user interface (GUI) environments, such as Microsoft® Windows™ ver. 3.X, Microsoft Windows 95, Windows NT®, IBM Corporation's OS/2®, and Geoworks® have been developed over the years. Of the aforementioned products, only Windows NT and OS/2 are true operating systems, as Geoworks and Windows 3.x must be loaded and run under the venerable Microsoft MS-DOS operating system. Windows 95 is somewhat of a hybrid, as it also requires portions of MS-DOS for its operation. For the sake of simplicity, though, both Windows 3.X and Windows 95 are referred to hereinafter as operating systems.

As this is written, Microsoft Windows ver. 3.X is far and away the most used operating system, having been bundled with nearly every personal computer sold between 1989 and mid-1995. However, from the date of its release in 1995, the Microsoft Windows 95 operating system from Microsoft Corporation has been bundled with most new, high-performance personal computers. In less than a year, it has become the operating system of choice for most business applications, and is expected to rapidly supplant Windows 3.X as the most used operating system for personal computers. The potential exists for significantly increasing the performance of both CD-ROM drives and distributed processing networks operating under Windows 3.x and Windows 95 operating systems through caching.

Shortly after the release of Windows 95, Sun Microsystems, Inc. (hereinafter also "Sun") set about to create a network and CD-ROM caching product that runs under both Windows 3.X and Windows 95, is completely transparent to end-users, and works with a wide variety of file systems running under both Windows 3.X and Windows 95. In order to fulfill these requirements in its recently released caching product, Sun utilizes the services provided by the Installable File System Manager (IFSMGR) virtual device driver. The IFSMGR driver—through a "hooking" process—permits the caching product to view all file system input/output (I/O) requests and to take interim control of the I/O operation and perform caching functions as needed. Thus, the new caching product is effectively "layered" between the IFSMGR driver and the generic file system of Windows 95. In a preferred embodiment of the invention, network memory resources and local CD-ROM drives are cached on a local hard disk drive. Optionally, caching may also be implemented in volatile memory.

The need for the present invention arose during the development of Sun's new caching product, which has been named "Solstice PC-CacheFS" (hereinafter "PC-CacheFS").
In order to implement a caching scheme, not only must file
data be cached, but directory information related to the
cache contents, as well.

SUMMARY OF THE INVENTION

When running under a Microsoft Windows operating
system (whether Windows 3.x or Windows 95), an application program may retrieve directory information by issuing
a SEARCH API request. The search request is defined to be
handle-based and looks something like the following exemplary routine written in "C" programming language code:

```
handle = findfirst("*.*", &find_data);
do {
    /* process find data */
} while (findnext(handle, &find_data) = = TRUE);
```

It will be noted that a handle is retrieved on the "findfirst"
function, and then reused for the "findnext" function.
Surprisingly, no function is defined for notifying the operating system that a search handle is no longer needed (i.e.,
Windows has no "findclose" function). This lack of closure
was relatively inconsequential when application programs
were run under a Windows operating system loaded on a
stand-alone system, as existing handle data structures are
erased when the system is re-booted or shut down. However,
this lack of closure is particularly problematic for a network
that is rarely rebooted or shut down. As each handle requires
identifying data which takes up a finite portion of memory,
the operating system may obviously not create an infinite
number of such handles.

This invention includes a method for reusing directory
search handles in a manner that minimizes the possibility
that a handle allocated for a directory search request that is
not yet complete will be reused. This method is implemented
by assigning a block of system memory at the time of system
initialization for the creation of a set of directory search and
retrieval handle structures. Handle structures within the set
are allocated as they are needed. When all have been
allocated, they are reused, one at a time in a least-recently-
used fashion which gives preference to handle structures
which have the lowest probability of being associated with
an incomplete search request. For any "findnext" SEARCH
API request involving a handle structure previously used for
a corresponding "findfirst" SEARCH API request, the existing set of handle structures is scanned to find a handle
structure having parameters which match those of the ongoing search so that the request may be continued. On the other
hand, if none is found, an error has occured. For any
"findfirst" SEARCH API request, the set of handles is
scanned and each handle is identified as belonging to one of
four sub-sets. The sub-sets, in descending order of
preference, are:

(a) unallocated (i.e., previously unused);

(b) allocated (i.e., previously used), but marked as "done";

(c) allocated, marked as "not done", but not using any wildcards; and (d) allocated, marked as "not done", but using wildcards.

The oldest available handle structure within the first
populated subset of highest preference is selected for reuse.
Information contained in the selected handle is then freed
up, the selected handle is subsequently initialized with new
information from the received "findfirst" request, following
which the search request is processed, and the results of the
search request returned.

DETAILED DESCRIPTION OF PREFERRED EMBODIMENTS

The embodiments of the invention described herein may
be implemented as logical operations in a distributed processing system having client and server computing systems.
The logical operations of the present invention are implemented (1) as a sequence of computer implemented steps
running on the computing system and (2) as interconnected
machine modules within the computing system. The implementation is a matter of choice that is dependent on the
performance requirements of the computing system implementing the invention. Accordingly, the logical operations
making up the embodiments of the invention described
herein are referred to variously as operations, steps or
modules.

Figure 1:
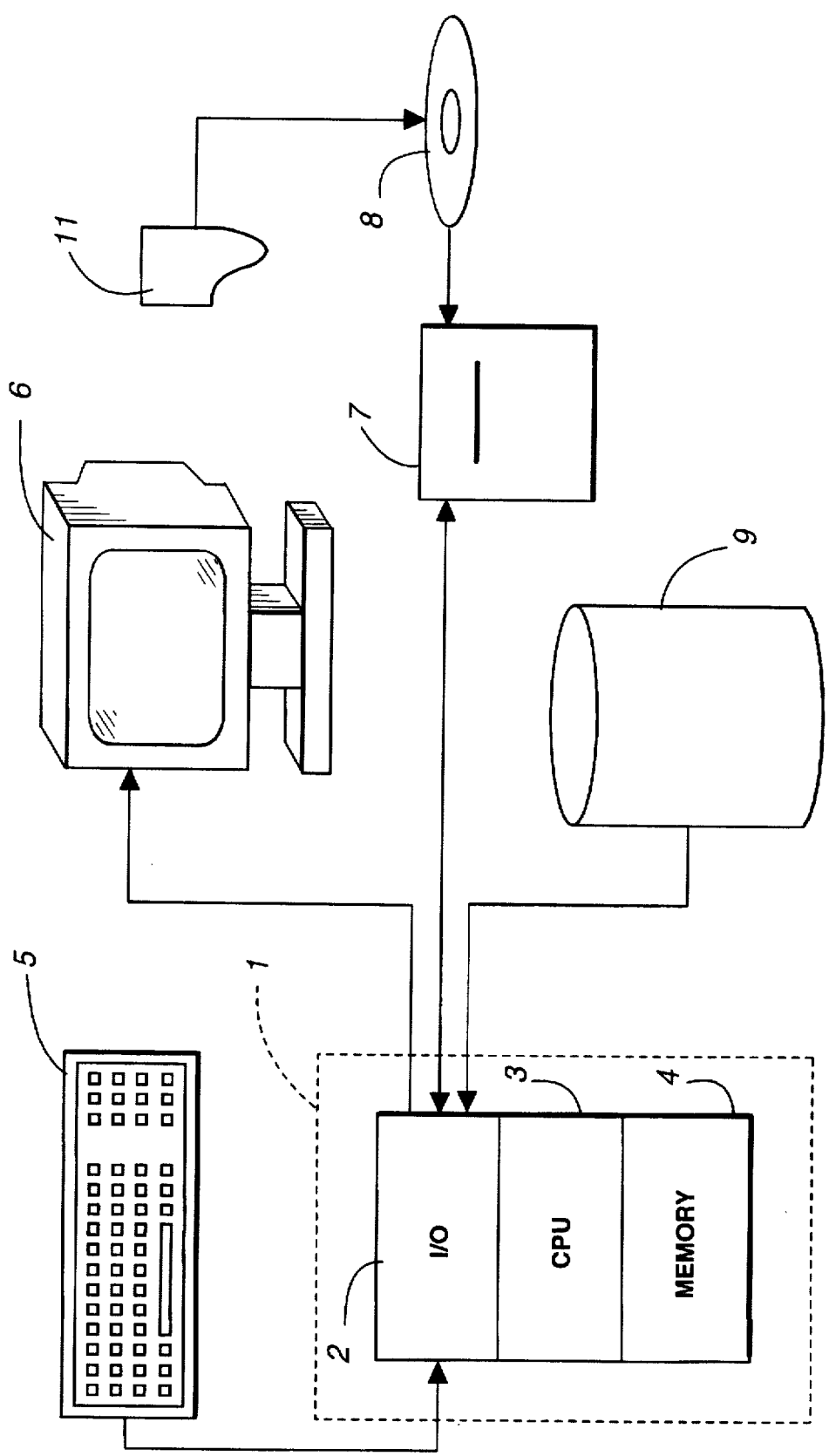
FIG. 1 illustrates a computing system for performing the
computer implemented steps of the method in accordance
with the invention.

The operating environment in which the present invention
is used encompasses the general distributed computing
system, wherein general purpose computers, workstations,
or personal computers (hereinafter local nodes) are connected via communication links of various types, in a
client-server arrangement, wherein programs and data,
many in the form of objects, are made available by various
members of the system. Some of the elements of a general
purpose workstation computer are shown in FIG. 1, wherein
a processor 1 is shown, the processor having an input/output
(I/O) section, a central processing unit (CPU) 3 and a
memory section 4. The I/O section 2 is connected to a
keyboard 5, a display unit 6, a disk storage unit 9 and a
CD-ROM drive unit 7. The CD-ROM unit 7 can read a
CD-ROM medium 8 which typically contains programs 10
and data. The computer program products containing
mechanisms to effectuate the apparatus and methods of the
present invention may reside in the memory section 4, or on
a disk storage unit 9, or on the CD-ROM 8 of such a system.
Examples of such systems include SPARC systems offered
by Sun Microsystems, Inc., personal computers offered by
IBM Corporation and by other manufacturers of IBM-
compatible personal computers, and systems running the
UNIX operating system.

In order to create an efficient caching product for any
operating system, it is necessary to store within the cache
memory not only a portion of the data from the memory
device or devices being cached, but also directory information related to the data stored in the cache memory. If no
permanent directory information were stored relating to the
data stored within the cache memory (in such a case,
directory information might be stored in volatile RAM), it
would be necessary to reload the cache at each boot-time
initialization step. Such a requirement would tend to lessen
the advantages for caching in the first place.

As heretofore explained, when running under Microsoft
Windows version 3.x or version 95, the search for and
retrieval of directory information is accomplished by issuing
a SEARCH API request. Each such search request utilizes a
data structure called a handle. The handle data structure
contains information which identifies the handle with a
particular search and also records the time at which the
search is begun. The following routine, written in C programming code, is an example of a SEARCH API request using the wild card file specifier "*.*".

```
handle = findfirst("*.*", &find_data);
do {
    /* process find data */
} while (findnext(handle, &find_data) = = TRUE);
```

It will be noted that a handle is retrieved on the "findfirst" function, and then reused for the related "findnext" function. Surprisingly, no function is defined for notifying the operating system that a search handle is no longer needed (i.e., Windows has no "findclose" function). Thus, a handle data structure continues to exist even after the search is complete. Although each handle data structure has a field for a "done" tag, if the SEARCH API request is carelessly written, a done tag may never be appended to the data structure. If a done tag has not been appended, there is no way to be sure that the search, for which the handle data structure was allocated, has been completed. As handle data structures are generally stored in volatile random access memory (RAM), this lack of closure is generally inconsequential for a standalone system (which most of the early systems running Windows 3.x were), as the handle data structures are erased when the system is re-booted or shut down. However, this lack of closure is particularly problematic for a network that is rarely rebooted or shut down. As each handle requires identifying data which takes up a finite portion of memory, the operating system may obviously not create an infinite number of such handles.

This invention, which was necessitated by need to perform handle-based searches on directory information stored in the cache, includes a method for reusing directory search handles in a manner that minimizes the possibility that a handle, allocated for a directory search request that is not yet complete, will be reused. This method is implemented by assigning a block of system memory at the time of system boot-time initialization for the creation of a set of directory search and retrieval handle structures. Handle structures within the set are allocated as they are needed. When all have been allocated, they are reused, one at a time in a least-recently-used fashion that gives preference to handle structures which have the lowest probability of being associated with an incomplete search request.

Figure 2:
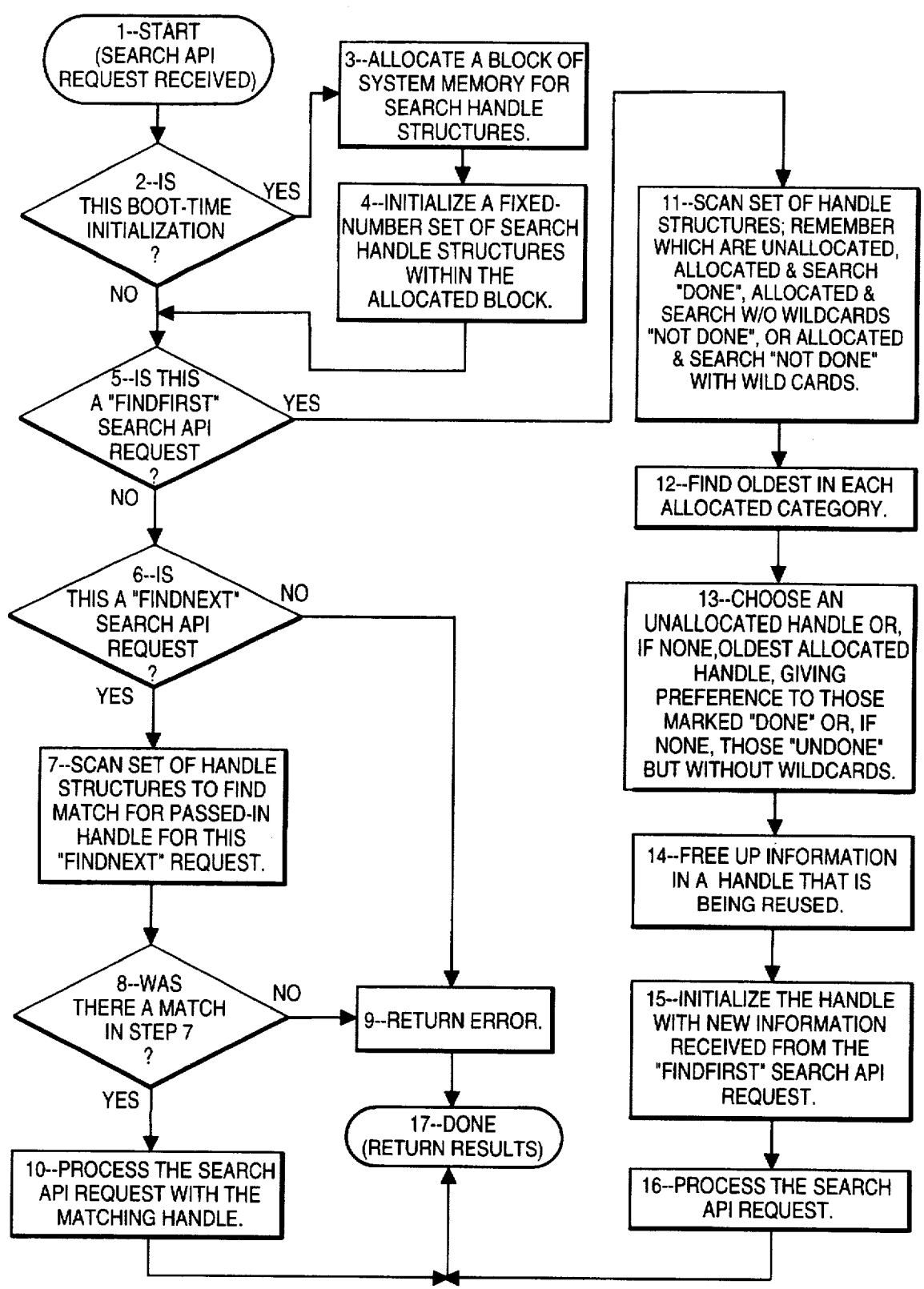
FIG. 2 is a flow chart depicting the steps utilized to
implement the smart, least-recently-used method for reusing
directory search handles.

The resuse of already allocated handle data structures is illustrated in detail by the pseudocode flow diagram of FIG. 2. At step 2, a determination is made as to whether or not an incoming SEARCH API request is being made at Windows boot-time initialization, or immediately subsequent to boot-time initialization, but before a set of handle data structures have been created within an allocated region of system memory. If the request is being made after the creation of the set of handle data structures, search request processing continues with step 5. However, if the request is being made at boot-time initialization, a portion of RAM is allocated in step 3, and the set of handle data structures is created within the allocated RAM in step 4 before going to step 5.

Referring now to step 5 of FIG. 2, a determination is made as to whether or not the SEARCH API request is a "findfirst" request. If it is, search request processing continues with step 11. If not, a determination is made in step 6 as to whether or not the SEARCH API request is a "findnext" request. If it is not a "findnext" request, search request processing is deemed complete, an error is returned in step 9, and a "done" tag is appended to the handle data structure for the search request. If, on the other hand, the incoming SEARCH API request is a "findnext" request, search request processing continues with step 7.

Referring now to step 7 of FIG. 2, the set of handle data structures is scanned to find a handle data structure that matches the incoming SEARCH API request. Step 8 determines whether or not a match exists. A match should be found in this case. If none is found, an error has occurred, and step 9 will return an error message to the operating system and conclude the search. If a match is found, the search request is processed to completion with the matching handle structure by step 10.

Still referring to FIG. 2, following a determination in step 5 that the incoming SEARCH API request is a "findfirst" request, the routine goes to step 11. In step 10, the set of handle data structures is scanned and each handle structure is identified as belonging to one of four sub-sets. The sub-sets, in descending order of preference, are:

(a) unallocated (i.e., previously unused);

(b) allocated (i.e., previously used), but marked as "done";

(c) allocated, marked as "not done", but not using any wildcards; and (d) allocated, marked as "not done", but using wildcards.

Step 11 also identifies the oldest handle structure of each subset, except those of subset (a), which have no data which reflects date or time of use.

Referring now to step 13 of FIG. 2, a handle data structure is chosen in the above-listed order of preference. If a handle structure from subset (b), (c), or (d) is selected, it is the oldest structure of that subset. In step 14, information contained in a handle structure selected in step 11 is freed up. In step 15, the handle structure selected in Step 11 is initialized with new information from the incoming "findfirst" request. Step 16 processes the request to completion and returns the results.

Thus, it can be seen that the method of the invention provides a way for reusing directory search handles in a manner that minimizes the possibility that a handle allocated for a directory search request that is not yet complete will be reused, since the handles are reclaimed in a hierarchical fashion based upon manner and time of use. Additionally, by reusing search handles within a set of finite number, unrestrained proliferation of handle structures with a concomitant usurpation of free memory is avoided.

While the invention has been particularly shown and described with reference to a preferred embodiment thereof, it will be understood by those skilled in the art that various other changes in the form and details may be made therein without departing from the spirit and scope of the invention.

What is claimed is:

1. A method for creating and using handle data structures employed in the processing of directory search requests, said method comprising the steps of:

providing for assigning a block of system memory at the time of system initialization and creating a set of unused handle structures within that block;

providing for determining if a directory search request requires a handle so that the directory search request can be processed;

providing for allocating and using the created unused handle structures as they are needed for processing individual directory search requests as determined by said determining step;

providing for selecting and reusing a previously-used handle structure when all unused handle structures have been allocated for previous uses.

2. The method of claim 1, wherein said step of providing for selecting and reusing a previously-used handle structure is accomplished in a least-recently-used fashion.

3. The method of claim 2, wherein said step of providing for selecting and reusing a previously-used handle structure is accomplished in a manner which gives preference to handle structures having the lowest probability of being associated with an incomplete search request.

4. The method of claim 3, wherein preference in reusing previously used handle structures is given to handle structures in the following descending order of preference:

(a) previously used handle structures which are marked "done";

(b) previously used handle structures which are marked "not done", but which have not been involved in search requests involving a wildcard file designation; and (c) previously used handle structures which are marked "not done", but which have been involved in search requests involving a wildcard file designation.

5. A method for creating and using handle data structures employed in the processing of directory search requests, said method comprising the steps of:

assigning a block of system memory at the time of system initialization and creating a set of unused handle structures within that block;

determining if a directory search request requires a handle so that the directory search request can be processed;

allocating and using the created unused handle structures as they are needed for processing individual directory search requests as determined by said determining step;

selecting and reusing a previously-used handle structure when all unused handle structures have been allocated for previous uses.

6. The method of claim 5, wherein said step of selecting and reusing a previously-used handle structure is accomplished in a least-recently-used fashion.

7. The method of claim 6, wherein said step of selecting and reusing a previously-used handle structure is accomplished in a manner which gives preference to handle structures having the lowest probability of being associated with an incomplete search request.

8. The method of claim 7, wherein preference in reusing previously used handle structures is given to handle structures in the following descending order of preference:

(a) previously used handle structures which are marked "done";

(b) previously used handle structures which are marked "not done", but which have not been involved in search requests involving a wildcard file designation; and (c) previously used handle structures which are marked "not done", but which have been involved in search requests involving a wildcard file designation.

9. A computer program product comprising a computer usable medium having computer readable code embodied therein for creating and using handle data structures employed in the processing of directory search requests, the computer program product comprising:

computer readable program code devices configured to cause a computer to effect assigning a block of system memory at the time of system initialization;

computer readable program code devices configured to cause a computer to effect creating a set of unused handle structures within the block of system memory;

computer readable program code devices configured to cause a computer to effect determining if a directory search request requires a handle so that the directory search request can be processed;

computer readable program code devices configured to cause a computer to effect allocating and using the created unused handle structures as they are needed for individual directory search requests; and computer readable program code devices configured to cause a computer to effect selecting and reusing a previously-used handle structure when all unused handle structures have been allocated for previous uses.

10. The computer program product of claim 9, which further comprises computer readable program code devices configured to cause a computer to effect selection and reuse of a previously-used handle structure in a least-recently-used fashion.

11. The computer program product of claim 10, which further comprises computer readable program code devices configured to cause a computer to effect selection and reuse of a previously-used handle structure in a manner which gives preference to handle structures having the lowest probability of being associated with an incomplete search request.

12. The computer program product of claim 10, which further comprises computer readable program code devices configured to cause a computer to effect a preference in reusing previously used handle structures in the following descending order of preference:

(a) previously used handle structures which are marked "done";

(b) previously used handle structures which are marked "not done", but which have not been involved in search requests involving a wildcard file designation; and (c) previously used handle structures which are marked "not done", but which have been involved in search requests involving a wildcard file designation.

* * * * *